L. R. CARPENTER.
Seed-Planter.
No. 25,556.
Patented Sept. 27, 1859.
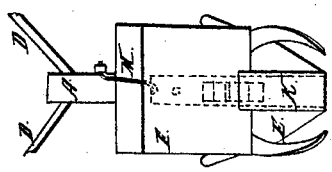
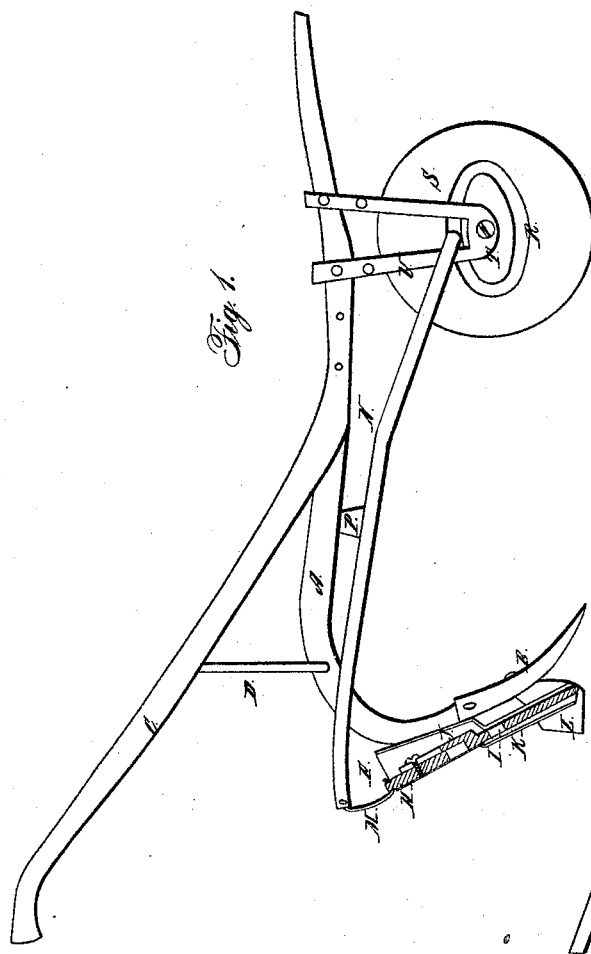
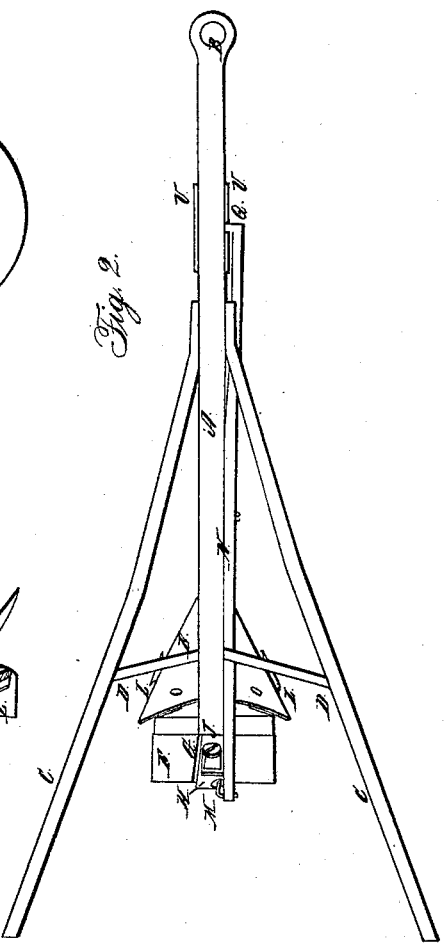
Witnesses:
William L Rigby
John Shafer
Inventor:
Lewis R Carpenter

UNITED STATES PATENT OFFICE.

LEWIS REESE CARPENTER, OF LANCASTER, OHIO.

IMPROVEMENT IN SEED-PLANTERS.

Specification forming part of Letters Patent No. 25,556, dated September 27, 1859.

*To all whom it may concern:*

Be it known that I, LEWIS REESE CARPENTER, of Lancaster, in the county of Fairfield and State of Ohio, have invented a new, useful, and Improved Seed-Planter; and I do hereby declare that the same is described and represented in the following specification and drawings.

To enable others skilled in the art to make and use my invention, I will proceed to describe its construction and operation, referring to the drawings, in which the same letters indicate like parts in each of the figures.

Figure 1 is a side elevation of my seed-planter. Fig. 2 is a plan or top view. Fig. 3 is a view of the rear of the seed-box.

The nature of my invention consists in the arrangement of the devices described in the following specification for joint operation in planting corn and other seeds.

In the accompanying drawings, A is the beam, made of wrought-iron, in the form shown in the drawings—that is, with a hole, B, in the fore end to hitch the animal to that is to draw the planter. The fore end of the handles C C are fastened to the beam A, and they are stayed by the braces D D from the rear part of the beam. The rear end of the beam behind the braces D D is bent down, as shown in Fig. 1, and the furrowing shovel or scraper E is fastened to it to furrow the ground just before the seed-dropping apparatus, which I will now describe.

F is a box to carry the seed to be planted, which box is made in the form represented and fastened to the rear side of that part of the beam A that is bent down, as shown in Fig. 1.

On the inside of the rear part of the seed-box F there are two cleats like that shown at G, Fig. 2, between which cleats the slide H traverses which drops the seed. The slide H has a long slot, I, in it to receive the seed, which slot is lengthened or shortened by the adjustable slide J, which is fastened to the slide H with a screw, as shown in the drawings. There is a case, K, fastened to the seed-box F, which extends down behind and on each side of the dropping-slide H, so arranged as to receive the seed from the slot I when the slide is pushed down, and it falls behind the slide to the bottom of the case, and when the slide is drawn up the seed rolls out into the furrow and is immediately covered with moist earth by the covering-scrapers L L, which are made in the form shown and fastened to the rear side of the furrowing-scraper E. The shanks of these covering-scrapers L L may be provided with one or more slots and fastened by screw-bolts, so that they may be adjusted to throw more or less earth onto the seed after it is dropped in the furrow. The slide H is perforated to receive the end of the link M, which connects it to the lever N, which operates the slide H.

The lever N may be made in the form shown in the drawings, and it is arranged to vibrate on a screw in the stand P, fastened to the beam A. The end Q of the lever N is bent at a right angle and inserted in the cam-groove R in the side of the wheel S, which is arranged under the beam A and rolls on the ground before the furrowing-scraper E. The wheel S turns on the screw-pin T, which passes through it and through the stands U U, fastened to the beam A, as shown in the drawings.

If it is desirable to drop the seed planted opposite to marks previously made upon the ground, so as to form rows at right angles, the lever N may be taken off and a bent lever substituted and arranged to come up by the side of the handle C, so that the slide H may be worked by the hand so as to drop the seed opposite to marks on the ground.

I believe I have described and represented my improved seed-planter so as to enable any person skilled in the art to make and use it.

I will now state what I desire to secure by Letters Patent, to wit:

The arrangement of the beam A, handles C C, braces D D, furrowing-scraper E, and seed-box F, with the planting-slide H, lever N, wheel S, and covering-scrapers L L, the whole being constructed for joint operation as described, for the purpose set forth.

LEWIS REESE CARPENTER.

Witnesses:
K. FRITTER,
J. C. JEFFRIES.